(12) United States Patent
Gualtieri

(10) Patent No.: US 7,944,123 B2
(45) Date of Patent: May 17, 2011

(54) APPARATUS AND METHOD FOR HARVESTING ENERGY FOR WIRELESS FLUID STREAM SENSORS

(75) Inventor: Devlin M. Gualtieri, Ledgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 588 days.

(21) Appl. No.: 12/033,164

(22) Filed: Feb. 19, 2008

(65) Prior Publication Data

US 2009/0206803 A1   Aug. 20, 2009

(51) Int. Cl.
*H02N 2/00* (2006.01)
(52) U.S. Cl. .............................. 310/339; 290/43; 290/54
(58) Field of Classification Search .................. 310/339; 290/54, 43
See application file for complete search history.

(56) References Cited

U.S. PATENT DOCUMENTS

| | | | |
|---|---|---|---|
| 3,900,830 A * | 8/1975 | Peterson | 340/940 |
| 4,387,318 A * | 6/1983 | Kolm et al. | 310/330 |
| 6,424,079 B1 * | 7/2002 | Carroll | 310/339 |
| 6,971,258 B2 | 12/2005 | Rhodes et al. | |
| 7,112,892 B2 * | 9/2006 | Mahowald | 290/54 |
| 7,155,334 B1 | 12/2006 | Stewart et al. | |
| 7,275,415 B2 | 10/2007 | Rhodes et al. | |
| 7,579,757 B2 | 8/2009 | Kulah et al. | |
| 2005/0140212 A1 | 6/2005 | Hamel et al. | |
| 2006/0016246 A1 | 1/2006 | Rhodes et al. | |
| 2006/0059152 A1 | 3/2006 | Nakamura | |
| 2006/0137346 A1 | 6/2006 | Stewart et al. | |
| 2007/0039589 A1 | 2/2007 | Stewart et al. | |
| 2007/0089399 A1 | 4/2007 | Rhodes et al. | |
| 2007/0125176 A1 | 6/2007 | Liu | |
| 2007/0137177 A1 | 6/2007 | Kittelson et al. | |
| 2007/0142999 A1 | 6/2007 | Baramov et al. | |
| 2007/0209865 A1 * | 9/2007 | Kokosalakis et al. | 181/0.5 |
| 2007/0271903 A1 | 11/2007 | Rhodes et al. | |
| 2007/0284969 A1 | 12/2007 | Xu | |
| 2008/0264144 A1 | 10/2008 | Mao et al. | |
| 2009/0261689 A1 | 10/2009 | Fang | |

FOREIGN PATENT DOCUMENTS

| | | |
|---|---|---|
| EP | 0 725 452 A1 | 8/1996 |
| WO | WO 01/20760 A1 | 3/2001 |
| WO | WO 02/084754 A2 | 10/2002 |

OTHER PUBLICATIONS

"Particulate-Based Flow Sensor", U.S. Appl. No. 11/836,926.
Devlin M. Gualtieri et al., "Electrode Structure for Particulate Matter Sensor", U.S. Appl. No. 12/020,950, filed Jan. 28, 2008.

(Continued)

*Primary Examiner* — Thomas M Dougherty
*Assistant Examiner* — Bryan P Gordon
(74) *Attorney, Agent, or Firm* — Muck Carter, LLP

(57) ABSTRACT

A method for harvesting energy for wireless fluid stream sensors is provided that includes locating a wireless fluid stream sensor in a fluid stream. The wireless fluid stream sensor includes a flexible membrane and a rod. Energy is harvested based on strain induced in the flexible membrane due to movement of the rod. The wireless fluid stream sensor may be powered with the harvested energy. The energy may be harvested with piezoelectric elements that are coupled to the flexible membrane or with piezoelectric elements or other type of energy-harvesting components that are located remotely from the wireless fluid stream sensor.

20 Claims, 3 Drawing Sheets

OTHER PUBLICATIONS

"Integrated DPF Loading and Failure Sensor", U.S. Appl. No. 11/804,236.

Shad Roundy, et al., "A study of low level vibrations as a power source for wireless sensor nodes", Computer Communications, vol. 26, 2003, p. 1131-1144.

P. Glynne-Jones, et al., "Towards a piezoelectric vibration-powered microgenerator", IEE Proc.-Sci. Meas. Technol., vol. 148, No. 2, Mar. 2001, p. 68-72.

Nathan S. Shenck, et al., "Energy Scavenging with Shoe-Mounted Piezoelectrics", 2001 IEEE, p. 30-42.

* cited by examiner

APPARATUS AND METHOD FOR
HARVESTING ENERGY FOR WIRELESS
FLUID STREAM SENSORS

TECHNICAL FIELD

This disclosure relates generally to process control systems and more specifically to an apparatus and method for harvesting energy for wireless fluid stream sensors.

BACKGROUND

Processing facilities, such as manufacturing plants, chemical plants, crude oil refineries, ore processing plants and the like, are often managed using process control systems. Among other operations, process control systems typically manage the use of motors, valves, and other industrial equipment in the processing facilities.

In conventional process control systems, controllers are often used to control one or more processes that are occurring or being implemented. The controllers may, for example, monitor the operation of the industrial equipment, provide control signals to the industrial equipment, and generate alarms when malfunctions are detected. Conventional process control systems are often responsible for monitoring and controlling numerous process variables, which generally represent characteristics of the process being monitored and controlled.

Fluid stream characteristics are one type of process variable that is frequently monitored in typical process control systems. For example, flow rate, temperature, pH, turbidity, and particulate matter content of a fluid stream may be monitored by sensors of a process control system. Wireless data transmission capability may be desirable for these sensors because fluid stream pipes are often in remote or inaccessible locations or because the necessary wiring would be relatively expensive, would need to be routed through one or several bulkheads, or would add too much weight to a vehicle in which the sensor is located.

However, one difficulty associated with implementing wireless sensors for monitoring properties of fluid streams is the power source needed for powering the wireless sensors. One solution to this difficulty is to use a battery for the power supply. However, this solution is non-ideal because batteries are limited in power supply capability and are not a reliable power source at very low or very high temperatures. Another solution to the power supply problem is to harvest energy from environmental sources, such as air flow, thermal gradient and vibration. One particular method uses a vibrating magnet in a coil, which produces electrical power by the Faraday effect. Another method uses piezoelectric materials attached to a vibrating beam. However, a disadvantage associated with this technique is that power is provided only when the vibration force is applied in a direction that excites the beam.

SUMMARY

This disclosure provides an apparatus and method for harvesting energy for wireless fluid stream sensors.

In a first embodiment, a method includes locating a wireless fluid stream sensor in a fluid stream. The wireless fluid stream sensor includes a flexible membrane and a rod. Energy is harvested based on strain induced in the flexible membrane due to movement of the rod.

In particular embodiments, the method further includes powering the wireless fluid stream sensor with the harvested energy.

In other particular embodiments, harvesting energy includes harvesting energy with energy-harvesting components located remotely from the wireless fluid stream sensor.

In yet other particular embodiments, the wireless fluid stream sensor further includes a plurality of piezoelectric elements, and the energy is harvested with the piezoelectric elements.

In other particular embodiments, the method further includes coupling the piezoelectric elements to the flexible membrane uniformly around the rod.

In a second embodiment, an apparatus includes a flexible membrane, a rod and at least one energy-harvesting component. The rod is coupled to the flexible membrane and is capable of inducing strain in the flexible membrane due to movement of the rod. The flexible membrane and the rod are implemented in a wireless fluid stream sensor. The energy-harvesting component is capable of harvesting energy based on the strain induced in the flexible membrane.

In particular embodiments, the wireless fluid stream sensor is located in a fluid stream and the movement of the rod is due to movement of the fluid stream.

In other particular embodiments, the wireless fluid stream sensor is located in a fluid stream of a vehicle. The movement of the rod is due to at least one of (i) movement of the fluid stream and (ii) vibrational movement resulting from movement of the vehicle.

In a third embodiment, an apparatus includes a frame, a flexible membrane, a rod and a plurality of piezoelectric elements. The flexible membrane is coupled to the frame. The frame is coupled between a base and an upper element and holds the flexible membrane spaced apart from the base. The upper element includes an opening to expose the flexible membrane. The rod is coupled to the flexible membrane and is capable of inducing strain in the flexible membrane due to movement of the rod. The piezoelectric elements are coupled to the flexible membrane and are capable of harvesting energy based on the strain induced in the flexible membrane.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
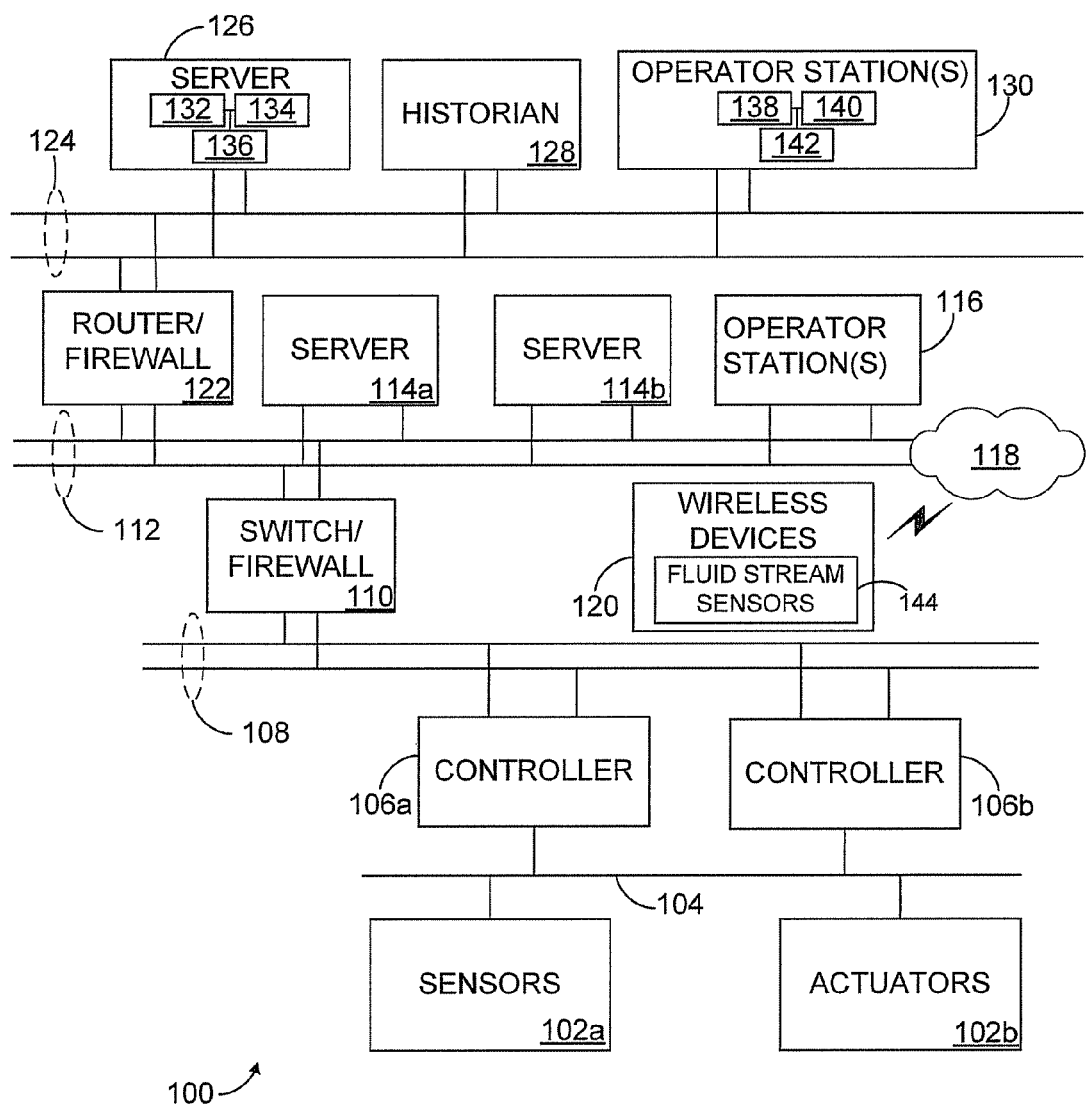
FIG. 1 illustrates a process control system capable of harvesting energy for wireless fluid stream sensors according to one embodiment of this disclosure.

FIG. 1 illustrates a process control system 100 according to one embodiment of this disclosure. The embodiment of the process control system 100 shown in FIG. 1 is for illustration only. Other embodiments of the process control system 100 may be used without departing from the scope of this disclosure.

In this embodiment, the process control system 100 includes various components that facilitate production or processing of at least one product or other material, such as one or more sensors 102a and one or more actuators 102b. The sensors 102a and actuators 102b represent components in a process system that may perform any of a wide variety of functions. For example, the sensors 102a may measure a wide variety of characteristics in a process system, such as temperature, pressure, or flow rate. Also, the actuators 102b may alter a wide variety of characteristics in the process system and may represent components such as heaters, motors, or valves. The sensors 102a and actuators 102b may represent any other or additional components in any suitable process system. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 may transport measurement data from the sensors 102a and provide control signals to the actuators 102b. The network 104 may represent any suitable network or combination of networks. As particular examples, the network 104 may represent an Ethernet network, an electrical signal network (such as a HART or FOUNDATION FIELDBUS network), a pneumatic control signal network, or any other or additional type(s) of network(s).

One or more controllers 106a-106b may be coupled to the network 104. The controllers 106a-106b may, among other things, use the measurements from the sensors 102a to control the operation of the actuators 102b. For example, the controllers 106a-106b may receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b may, for example, represent multivariable predictive control (MPC) controllers or other types of controllers that implement control logic (such as logic associating sensor measurement data to actuator control signals). Each of the controllers 106a-106b may, for example, represent a computing device running a MICROSOFT WINDOWS operating system, a LINUX operating system, or any of a number of operating systems suited for such an application.

One or more networks 108 may be coupled to the controllers 106a-106b. The networks 108 facilitate interaction with the controllers 106a-106b, such as by transporting data to and from the controllers 106a-106b. The networks 108 may represent any suitable networks or combination of networks. As particular examples, the networks 108 may represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 may represent any suitable networks, such as a pair of Ethernet networks or an FTE network.

One or more servers 114a-114b may be coupled to the networks 112. The servers 114a-114b perform various functions to support the operation and control of the controllers 106a-106b, sensors 102a, and actuators 102b. For example, the servers 114a-114b may log information collected or generated by the controllers 106a-106b, such as measurement data from the sensors 102a or control signals for the actuators 102b. The servers 114a-114b may also execute applications that control the operation of the controllers 106a-106b, thereby controlling the operation of the actuators 102b. In addition, the servers 114a-114b may provide secure access to the controllers 106a-106b. Each of the servers 114a-114b includes any hardware, software, firmware, or combination thereof for providing access to, control of, or operations related to the controllers 106a-106b. Each of the servers 114a-114b may, for example, represent a computing device running a MICROSOFT WINDOWS operating system, a LINUX operating system, or any of a number of operating systems suited for such an application.

One or more operator stations 116 may be coupled to the networks 112. The operator stations 116 represent computing or communication devices providing user access to the servers 114a-114b, which may then provide user access to the controllers 106a-106b (and possibly the sensors 102a and actuators 102b). As particular examples, the operator stations 116 may allow users to review the operational history of the sensors 102a and actuators 102b using information collected by the controllers 106a-106b and/or the servers 114a-114b. The operator stations 116 may also allow the users to adjust the operation of the sensors 102a, actuators 102b, controllers 106a-106b, or servers 114a-114b. In addition, the operator stations 116 may receive and display warnings or other messages or displays generated by the controllers 106a-106b or the servers 114a-114b. Each of the operator stations 116 includes any hardware, software, firmware, or combination thereof for supporting user access and control of the system 100. Each of the operator stations 116 may, for example, represent a computing device running a MICROSOFT WINDOWS operating system, a LINUX operating system, or any of a number of operating systems suited for such an application.

The system 100 may also include a wireless network 118, which can be used to facilitate communication with one or more wireless devices 120. The wireless network 118 may use any suitable technology to communicate, such as radio frequency (RF) signals. Also, the wireless devices 120 may represent devices that perform any suitable functions. The wireless devices 120 may, for example, represent wireless sensors, wireless actuators, and remote or portable operator stations or other user devices. The network 118 may be coupled to networks 112 or otherwise suitably coupled to the system 100 in order to provide communication between the wireless devices 120 and other components within the system 100.

At least one router/firewall 122 couples the networks 112 to networks 124. The router/firewall 122 includes any suitable structure for providing communication between networks, such as a secure router or combination router/firewall. The networks 124 may represent any suitable networks, such as a pair of Ethernet networks or an FTE network.

The system 100 may also include at least one additional server 126 coupled to the networks 124. The server 126 executes various applications to control the overall operation of the system 100. For example, the system 100 may be used in a processing plant or other facility, and the server 126 may execute applications used to control the plant or other facility. As particular examples, the server 126 may execute applications such as enterprise resource planning (ERP), manufacturing execution system (MES), or any other or additional plant or process control applications. The server 126 includes any hardware, software, firmware, or combination thereof for controlling the overall operation of the system 100.

A historian 128 may also be coupled to the networks 124. The historian 128 generally collects information associated with the operation of the system 100. For example, the historian 128 may collect measurement data associated with the operation of the sensors 102a. The historian 128 may also collect control data provided to the actuators 102b. The historian 128 may collect any other or additional information associated with the process control system 100. The historian 128 includes any suitable storage and retrieval device or devices, such as a database.

One or more operator stations 130 may also be coupled to the networks 124. The operator stations 130 represent computing or communication devices providing, for example, user access to the servers 114a-114b, 126 and the historian 128. Each of the operator stations 130 includes any hardware, software, firmware, or combination thereof for supporting user access and control of the system 100. Each of the operator stations 130 may, for example, represent a computing device running a MICROSOFT WINDOWS operating system, a LINUX operating system, or any of a number of operating systems suited for such an application.

In particular embodiments, the various servers and operator stations may represent computing devices. For example, each of the servers 114a-114b, 126 may include one or more processors 132 and one or more memories 134 for storing instructions and data used, generated, or collected by the processor(s) 132. Each of the servers 114a-114b, 126 may also include at least one network interface 136, such as one or more Ethernet interfaces. Also, each of the operator stations 116, 130 may include one or more processors 138 and one or more memories 140 for storing instructions and data used, generated, or collected by the processor(s) 138. Each of the operator stations 116, 130 may also include at least one network interface 142, such as one or more Ethernet interfaces.

For the illustrated example, the wireless devices 120 may comprise one or more wireless fluid stream sensors 144. However, it will be understood that the sensors 144 may be implemented in the system 100 in any other suitable manner. For example, the wireless fluid stream sensors 144 may be coupled to the system 100 through a separate wireless network (not illustrated in FIG. 1).

Each of the wireless fluid stream sensors 144 is operable to monitor fluid data related to a fluid stream. As used herein, "fluid data" means information regarding one or more process variables for the fluid stream, such as flow rate, temperature, pH, turbidity, particulate matter content of the fluid stream, and the like. The sensors 144 are also operable to forward the fluid data to one or more components of the system 100 for analysis and/or presentation to an operator of the system 100.

For one embodiment, the wireless fluid stream sensors 144 are operable to forward the fluid data to other components of the system 100 by way of the wireless network 118, which may be coupled to any suitable network(s), such as networks 112, in the system 100 in order to provide communication between the wireless sensors 144 and the other components in the system 100. Each sensor 144 includes any hardware, software, firmware, or combination thereof for monitoring fluid data and forwarding the fluid data as previously described.

As described in more detail below, at least one of the wireless fluid stream sensors 144 is operable to harvest environmental energy in order to power the sensor 144. The harvested energy may provide sufficient power for the sensor 144 to operate. Alternatively, the harvested energy may provide a portion of the energy, while another portion of the energy is provided in any other suitable manner. For example, a battery and/or other power sources may be used to supplement the harvested energy.

In one aspect of operation, at least one of the components in the process control system 100 can implement or support fluid stream monitoring functionality that allows operators to receive fluid data and act to minimize or correct any problems existing within the processes being used in the process system based on the fluid data. For example, at least one wireless fluid stream sensor 144 is used in the system 100 to generate fluid data for a corresponding fluid stream.

Although FIG. 1 illustrates one example of a process control system 100, various changes may be made to FIG. 1. For example, a control system may include any number of sensors, actuators, controllers, servers, operator stations, and networks. Also, the makeup and arrangement of the process control system 100 in FIG. 1 is for illustration only. Components may be added, omitted, combined, or placed in any other suitable configuration according to particular needs. In addition, FIG. 1 illustrates one operational environment in which wireless fluid stream sensors 144 may be used. The sensors 144 may be implemented in any other suitable device or system.

Figure 2:
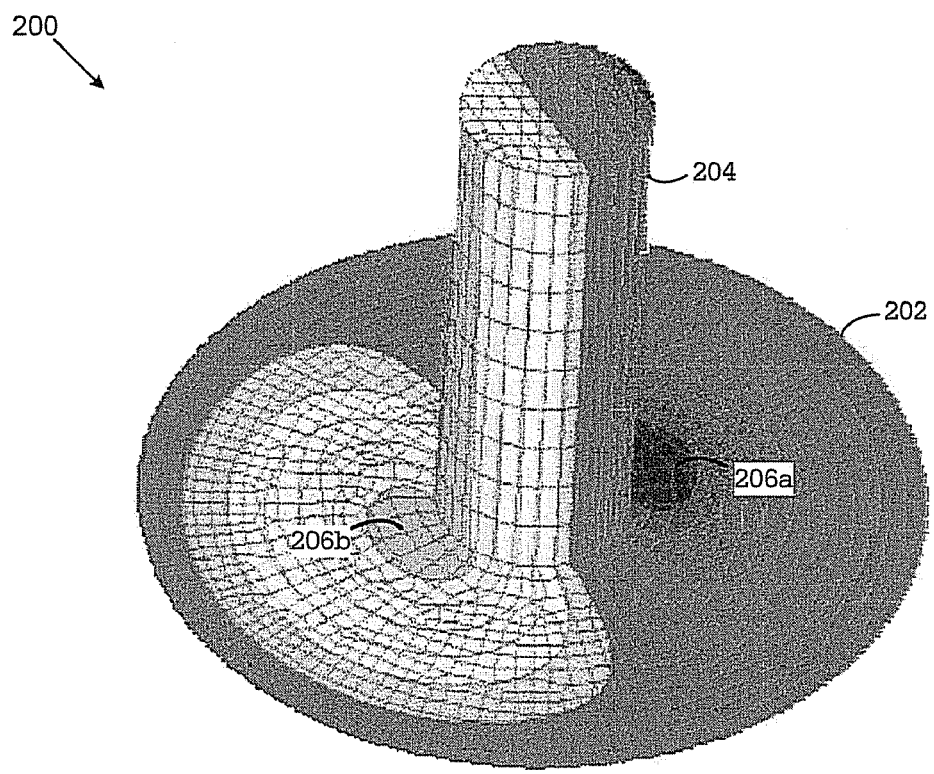
FIG. 2 illustrates a strain distribution induced in a flexible membrane by movement of a rod coupled to the flexible membrane.

FIG. 2 illustrates a graph 200 of strain distribution induced in a flexible membrane 202 by movement of a rod 204 coupled to the flexible membrane 202. When a rod 204 is coupled to a flexible membrane 202, movement of the rod 204 will cause strain in the flexible membrane 202. The strain distribution in the flexible membrane 202 is dependent on the direction of the rod motion, but any direction of movement by the rod 204 will cause strain in some portion of the flexible membrane 202 similar to that illustrated in the graph 200.

For the illustrated example, the rod 204 has moved generally towards the right. This results in opposing maximum strain regions 206a-b, with the maximum strain region 206a resulting in the flexible membrane 202 dimpling downward and the maximum strain region 206b resulting in the flexible membrane 202 dimpling upward. It will be understood that, although a relatively thin flexible membrane 202 will actually have these dimples at the maximum strain regions 206a-b, a flexible membrane 202 that is relatively thick will have similar maximum strain regions 206a-b even though actual dimples may not be evident in these regions 206a-b.

Although FIG. 2 illustrates one example of a strain distribution graph 200, various changes may be made to FIG. 2. For example, the flexible membrane 202 is shown as circular in shape. However, the flexible membrane 202 may be any other suitable shape. In addition, although the rod 204 is shown as cylindrical in shape, the rod 204 may also be any other suitable shape. Thus, the makeup and arrangement of the flexible membrane 202 and rod 204 in FIG. 2 is for illustration only.

Figure 3:
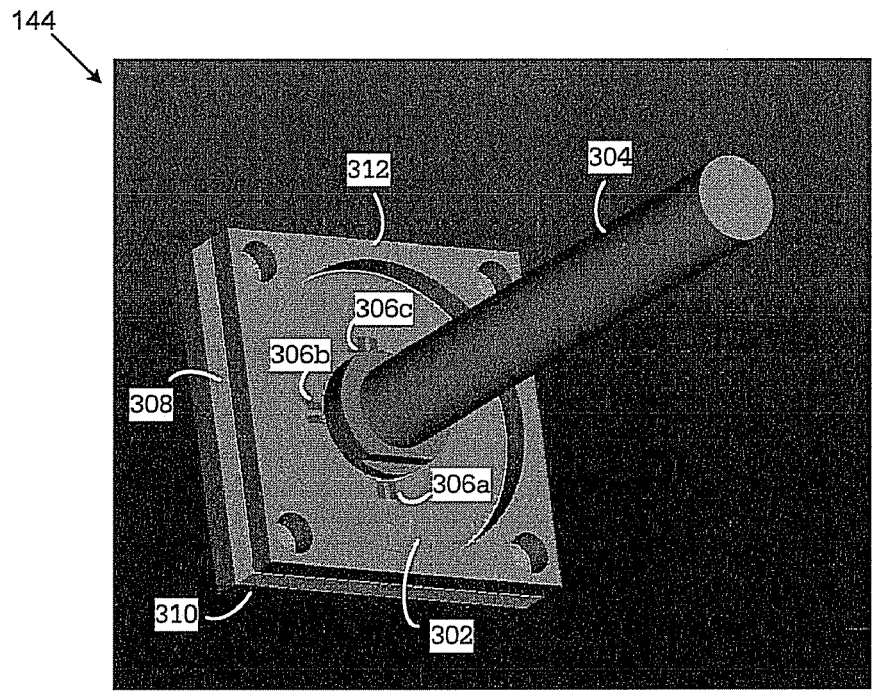
FIG. 3 illustrates a wireless fluid stream sensor capable of harvesting energy in accordance with the strain distribution as illustrated in FIG. 2 according to one embodiment of this disclosure.

FIG. 3 illustrates a wireless fluid stream sensor 144 capable of harvesting energy in accordance with the strain distribution as illustrated in the graph 200 of FIG. 2 according to one embodiment of this disclosure. For this embodiment, the wireless fluid stream sensor 144 comprises a flexible membrane 302, a rod 304 coupled to the flexible membrane 302, and a plurality of piezoelectric elements 306. The rod 304 of the illustrated wireless fluid stream sensor 144 is coupled to the flexible membrane 302 at substantially the center of the flexible membrane 302.

Although the illustrated embodiment shows three piezoelectric elements 306a-c, it will be understood that the wireless fluid stream sensor 144 may comprise any suitable number of piezoelectric elements 306. For a particular example, although not viewable in FIG. 3, a fourth piezoelectric element 306 may be included opposite the piezoelectric element 306b. The piezoelectric elements 306 may be located at the maximum strain regions of the flexible membrane 302 and may be located substantially uniformly around the rod 304. By providing piezoelectric elements 306 substantially uniformly around the rod 304, the wireless fluid stream sensor 144 allows electrical energy to be harvested based on movement of the rod 304 in any direction. The electrical energy thus generated may then be summed together.

The wireless fluid stream sensor 144 may represent a particulate matter sensor, such as that described in U.S. Pat. No. 6,971,258 issued to Rhodes, et al. However, it will be understood that the wireless fluid stream sensor 144 may represent any other particulate matter sensor or other suitable component without departing from the scope of this disclosure.

For the illustrated embodiment, the flexible membrane 302 may be circular in shape and may be coupled to a frame 308. The frame 308 may be coupled between a base 310 and an upper element 312. The illustrated upper element 312 has a circular opening such that the flexible membrane 302 is exposed. In addition, the frame 308 may hold the flexible membrane 302 away from the base 310 in order to provide space behind the flexible membrane 302 to allow room for dimpling. Thus, for the illustrated embodiment, the flexible membrane 302 and rod 304 may behave in accordance with the strain distribution graph 200 of FIG. 2.

For a particular embodiment in which the wireless fluid stream sensor 144 represents a particulate matter sensor for use in a vehicle, energy may be harvested from road vibrations, as well as variations in gas stream flow. For some implementations, the vibrational movement from these separate sources would be orthogonal to each other and thus could not be harvested efficiently with a single cantilever beam structure. Using the described wireless fluid stream sensor 144, however, even orthogonal vibrational sources may be summed together to generate energy.

For one particular embodiment, the rod 304 may serve as the rod element of a particulate matter sensor, as previously described. For this embodiment, the particulate matter sensor circuitry, including the energy harvesting conversion circuitry, the regulating circuitry, and the wireless data transmission circuit elements, may be placed on the flexible membrane 302 itself using standard screen-printed wiring board techniques. Because the periphery of the flexible membrane 302 is the region of least strain, most circuit elements may be located near this periphery. Also for this particular embodiment, the circuitry may be spaced away from the sensor itself and surrounded by a finned, or other type of, cooling fixture and protected by a thermal barrier. This protects temperature-sensitive circuitry from elevated temperature regions in exhaust streams.

Although FIG. 3 illustrates one example of a wireless fluid stream sensor 144, various changes may be made to FIG. 3. For example, for the illustrated sensor 144, the piezoelectric elements 306 are coupled to the flexible membrane 302. However, as an alternative, a mechanical transmission fixture may be used to transmit the strain energy to a remote energy-harvesting device that includes the piezoelectric elements 306. In this way, the piezoelectric elements 306 may be removed from a potential heat source. For a particular example, the rod 304 may extend through the flexible membrane 302, and the vibrational movement of a remote end of the rod 304 may be used to excite the energy-harvesting device. In addition, as another alternative, instead of being a piezoelectric-type of energy-harvesting device, the remote energy-harvesting device may be a magnetic-type or other suitable type of energy-harvesting device. Thus, the makeup and arrangement of the wireless fluid stream sensor 144 in FIG. 3 is for illustration only.

Figure 4:
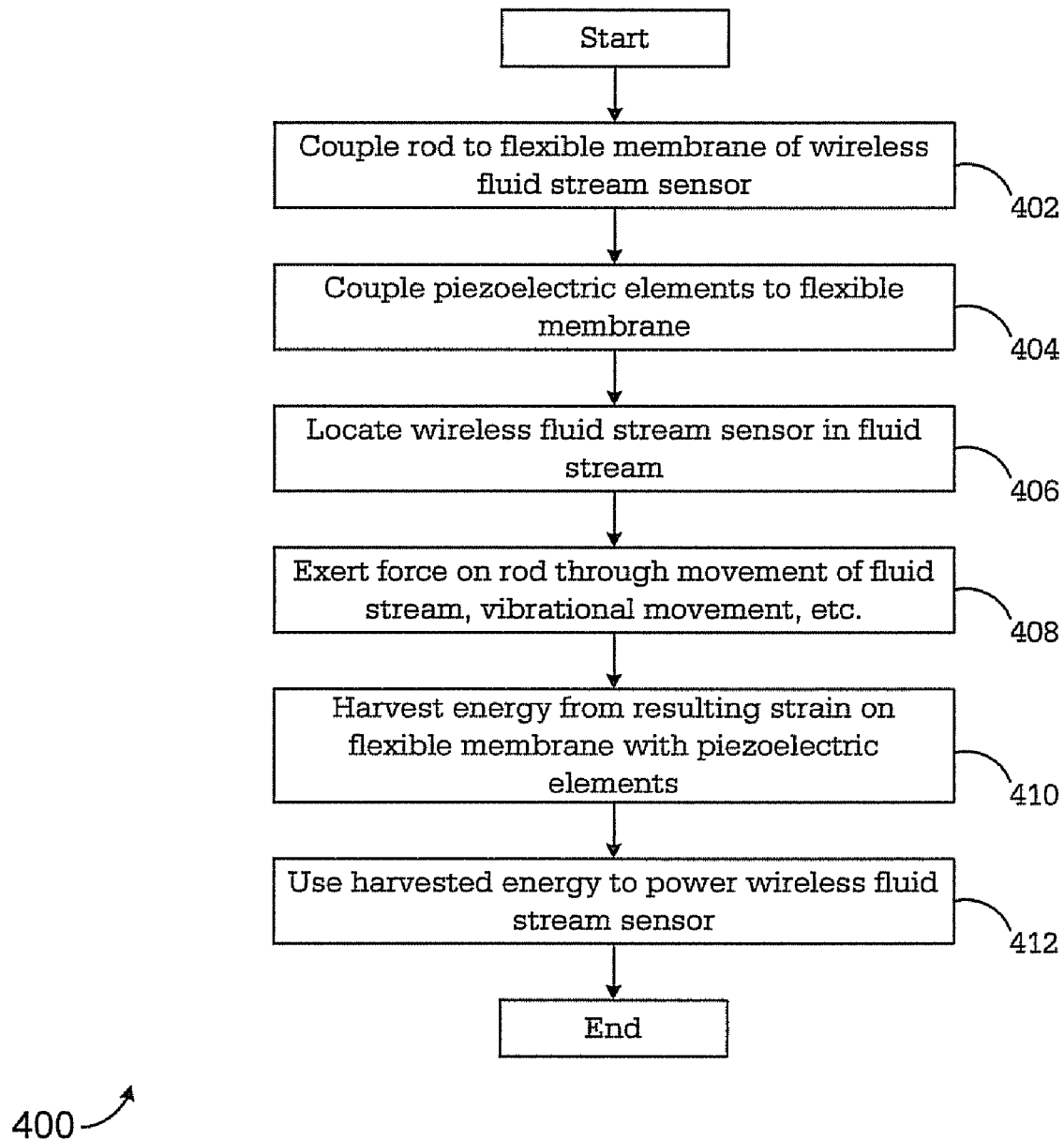
FIG. 4 illustrates a method for harvesting energy in the wireless fluid stream sensor of FIG. 3 according to one embodiment of this disclosure.

FIG. 4 illustrates a method 400 for harvesting energy in the wireless fluid stream sensor 144 according to one embodiment of this disclosure. The embodiment of the method 400 is for illustration only. Other embodiments of the method 400 may be implemented without departing from the scope of this disclosure.

As shown in FIG. 4, a method 400 includes coupling a rod 304 to a flexible membrane 302 of a wireless fluid stream sensor 144 at step 402. One or more piezoelectric elements 306 are coupled to the flexible membrane 302 at step 404. For a particular example, four piezoelectric elements 306 may be coupled substantially uniformly around the rod 304 at the expected maximum strain regions 206 for the flexible membrane 302.

The wireless fluid stream sensor 144 is located in a fluid stream at step 406. Thus, the wireless fluid stream sensor 144 may sense characteristics of the fluid stream in which the sensor 144 is placed. Forces are exerted on the rod 304 through the movement of this fluid stream, vibrational movement such as caused by movement of a vehicle in which the sensor 144 is located and/or other suitable forces at step 408.

The forces exerted on the rod 304 result in strain on the flexible membrane 302, and based on this resulting strain, energy is harvested with the piezoelectric elements 306 at step 410. The energy harvested by the piezoelectric elements 306 is used to power the wireless fluid stream sensor 144 at step 412. The wireless fluid stream sensor 144 may be powered by only this harvested energy or may be partially powered by the harvested energy and partially powered by one or more additional power sources.

Although FIG. 4 illustrates an example of a method 400 for harvesting energy in the wireless fluid stream sensor 144, various changes may be made to this method 400. For example, as described above in connection with FIG. 3, the piezoelectric elements 306 or other suitable type of energy-harvesting component(s) (for example, magnetic) may be located remotely from the sensor 144 in an energy-harvesting device, and the strain induced in the flexible membrane 302 by movement of the rod 304 may be transmitted to the remote energy-harvesting device. Also, while shown as a series of steps, the steps in the method 400 may overlap, occur in parallel, occur multiple times, or occur in a different order.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The term "each" means every one of at least a subset of the identified items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   locating a wireless fluid stream sensor in a fluid stream, the wireless fluid stream sensor comprising a flexible membrane and a rod that is substantially perpendicular to a plane of the flexile membrane; and
   harvesting energy based on strain induced in the flexible membrane due to movement of the rod.

2. The method of claim 1, further comprising powering the wireless fluid stream sensor with the harvested energy.

3. The method of claim 1, wherein harvesting the energy comprises harvesting the energy with at least one energy-harvesting component located remotely from the wireless fluid stream sensor.

4. The method of claim 1, wherein the wireless fluid stream sensor further comprises a plurality of piezoelectric elements, and wherein harvesting the energy comprises harvesting the energy with the piezoelectric elements.

5. The method of claim 4, wherein the piezoelectric elements are coupled to the flexible membrane.

6. A method comprising:
   locating a wireless fluid stream sensor in a fluid stream, the wireless fluid stream sensor comprising a flexible membrane, a rod, and a plurality of piezoelectric elements coupled to the flexible membrane substantially uniformly around the rod; and
   harvesting energy based on strain induced in the flexible membrane due to movement of the rod using the piezoelectric elements.

7. An apparatus comprising:
   a flexible membrane;
   a rod coupled to the flexible membrane, wherein the rod is substantially perpendicular to a plane of the flexile membrane, wherein the rod is configured to induce strain in the flexible membrane due to movement of the rod; and
   at least one energy-harvesting component configured to harvest energy based on the strain induced in the flexible membrane.

8. The apparatus of claim 7, wherein the at least one energy-harvesting component is configured to power a wireless fluid stream sensor using the harvested energy.

9. The apparatus of claim 7, wherein the at least one energy-harvesting component comprises at least one piezoelectric element.

10. The apparatus of claim 9, wherein the at least one piezoelectric element is coupled to the flexible membrane.

11. An apparatus comprising:
    a flexible membrane;
    a rod coupled to the flexible membrane, wherein the rod is configured to induce strain in the flexible membrane due to movement of the rod; and
    at least one energy-harvesting component configured to harvest energy based on the strain induced in the flexible membrane;
    wherein the at least one energy-harvesting component comprises a plurality of piezoelectric elements coupled to the flexible membrane substantially uniformly around the rod.

12. The apparatus of claim 8, wherein the at least one energy-harvesting component is located remotely from the wireless fluid stream sensor.

13. The apparatus of claim 8, wherein the wireless fluid stream sensor is configured to be located in a fluid stream.

14. The apparatus of claim 13, wherein the movement of the rod is due to movement of the fluid stream.

15. The apparatus of claim 13, wherein the wireless fluid stream sensor is configured to be located in a fluid stream of a vehicle, and wherein the movement of the rod is due to at least one of (i) movement of the fluid stream and (ii) vibrational movement resulting from movement of the vehicle.

16. An apparatus comprising:
    a frame;
    a flexible membrane coupled to the frame, the frame coupled between a base and an upper element, the frame holding the flexible membrane spaced apart from the base, the upper element comprising an opening to expose the flexible membrane;
    a rod coupled to the flexible membrane, wherein the rod is configured to induce strain in the flexible membrane due to movement of the rod; and
    a plurality of piezoelectric elements coupled to the flexible membrane, the piezoelectric elements configured to harvest energy based on the strain induced in the flexible membrane.

17. The apparatus of claim 16, wherein the frame, the flexible membrane, the rod, and the piezoelectric elements are implemented in a wireless fluid stream sensor.

18. The apparatus of claim 17, wherein the wireless fluid stream sensor is configured to be powered by the harvested energy.

19. The apparatus of claim 17, wherein the wireless fluid stream sensor is configured to be located in a fluid stream of a vehicle.

20. The apparatus of claim 19, wherein the movement of the rod is due to at least one of (i) movement of the fluid stream and (ii) vibrational movement resulting from movement of the vehicle.

* * * * *